(No Model.)
I. LEVY.
BRAKE FOR BABY CARRIAGES.
No. 405,041. Patented June 11, 1889.
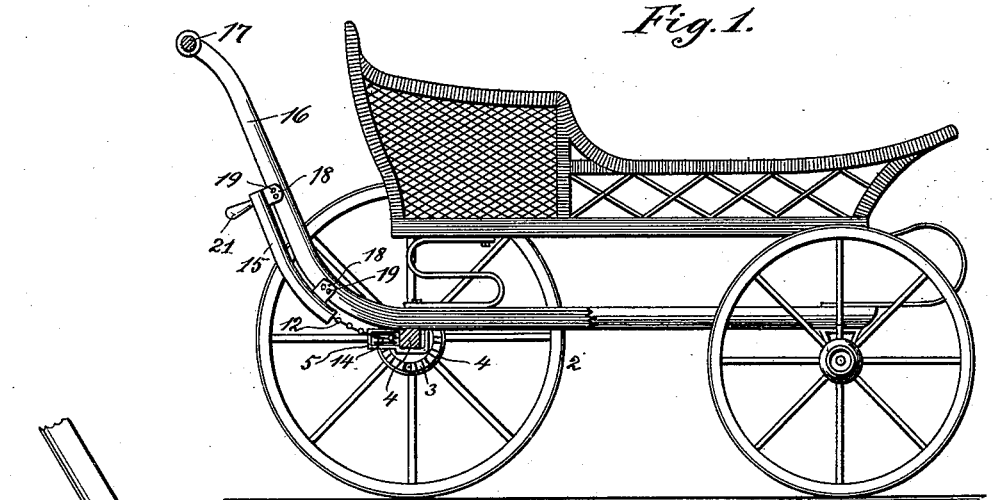
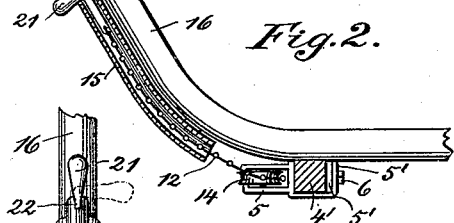
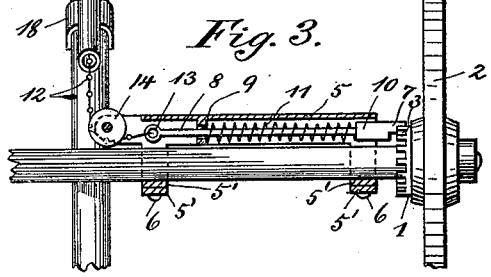
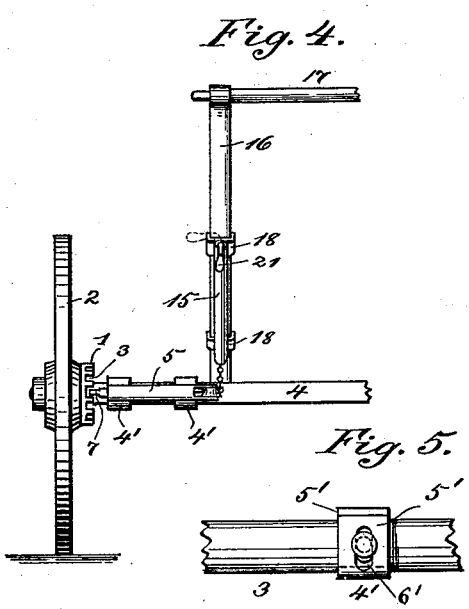
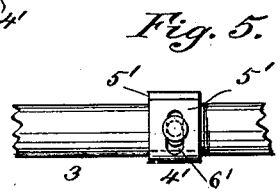
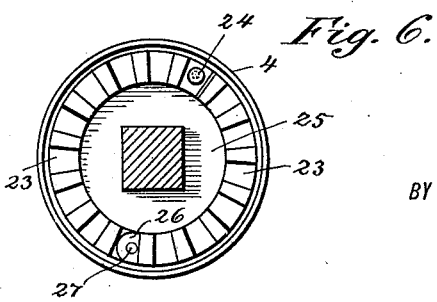
WITNESSES:
D. C. Reusch.
C. Sedgwick.
INVENTOR:
I Levy
BY Munn & Co
ATTORNEYS.

UNITED STATES PATENT OFFICE.

ISAAC LEVY, OF NEWPORT, RHODE ISLAND.

BRAKE FOR BABY-CARRIAGES.

SPECIFICATION forming part of Letters Patent No. 405,041, dated June 11, 1889.

Application filed October 19, 1888. Serial No. 288,543. (No model.)

*To all whom it may concern:*

Be it known that I, ISAAC LEVY, of Newport, in the county of Newport and State of Rhode Island, have invented a new and Improved Brake for Baby-Carriages, of which the following is a full, clear, and exact description.

This invention relates to brakes for baby-carriages, and has for its object to provide a simple and effective brake for that purpose.

The invention consists in a brake for baby-carriages, constructed and arranged as hereinafter described and claimed.

Reference is to be had to the accompanying drawings, forming a part of this specification, in which similar figures of reference indicate corresponding parts in all the views.

Figure 1 illustrates a baby-carriage, partly broken away and in section, with the invention applied. Fig. 2 is a detail view showing a portion of the brake mechanism, with parts broken away and in section. Fig. 3 shows a portion of the rear axle and wheel, with the brake, the casing of the brake-bolt being in section; and Fig. 4 is a detail view showing a rear wheel and the brake mechanism, with rear axle and carriage-handle broken away. Fig. 5 is a portion of rear axle, showing an adjustable sleeve; and Fig. 6 is an end view of a hub, with axle in section, showing detachable ratchet-ring secured thereto.

In carrying out the invention, a collar or ring 1 is secured to the inner portion of the hub of one of the rear wheels 2 of a baby-carriage, the collar 1 being formed on its inner face with ratchet-teeth 3. Adjacent to the ratchet-teeth 3 is located on the rear axle 4 of the carriage a suitable casing 5, secured thereto by sleeves 4', which are formed by arms integral with the casing, and preferably adjustable so as to be fitted to any sized axle or readily removed, if desired. The sleeves 4' are preferably formed with overlapping elastic or yielding ends 5', so as to be adjusted over any sized axle and held by a set-screw 6 movable in slots 6'. Within the casing 5 is located a sliding bolt 7, adapted to engage the teeth 3 and lock the wheel 2, and having a guide-rod 8 projecting through a guide-block 9 in the casing 5. Between the shouldered portion 10 of bolt 7 and the guide-block 9 is a coiled spring 11 encircling the guide-rod 8, and by its tension tending to throw out the bolt 7 in the outer end of casing 5 and hold it in locked position or engagement with the ratchet-teeth 3. The bolt 7 may be retracted and held out of engagement with the ratchet-teeth 3 by any suitable mechanism.

As here shown, the operating mechanism consists of a chain or cord 12, connected at one end to an eye 13 at the inner end of guide-rod 8, and extending under a pulley 14, mounted on the rear opening of casing 5, and passing up through a tube or casing 15, mounted on one of the arms 16 of the handle 17 in any suitable manner, and, as here shown, by means of sleeves 18, held by screws 19. The chain 12 is connected to an L-shaped handle 20 at the upper end of tube or casing 15, the arm 21 of which rests in a slot 22 at the upper end of casing 15, when the bolt 7 is in engagement with ratchet-teeth 3, as shown in Figs. 3 and 4. When it is desired to hold the bolt 7 out of engagement with the teeth 3, it is released by drawing back the handle 20 until the arm 21 is drawn out of slot 22, when it is turned to bring the arm 21 against the end of casing 15, as shown in dotted lines in Figs. 2, 3, and 4. The handle 20 is preferably located at such a point on the arm 16 as to be within reach of a child.

By means of the construction and arrangement of the parts as herein set forth, the appliance is rendered simple, takes up little room, and is not unsightly. The main object of the brake being to lock the wheel of a baby-carriage, so that when left at rest it will not accidentally be set in motion and run away, the purpose is fully accomplished by simply locking one wheel.

The arrangement of the ratchet-teeth on the inner face of the hub of a rear wheel, and a locking-bolt on the axle adjacent thereto, adapts the invention to be readily fitted to any size baby-carriage. The wheel is readily locked by simply turning the arm 21 of handle 20 to register with slot 22, when the arm 21 is drawn into the slot 22, and the bolt thrown into engagement with ratchet-teeth 3 by the action of spring 11.

While a solid collar or ring with ratchet-teeth may be employed, a ring constructed so as to be detachable is preferably employed, whereby the ratchet-ring may be attached or detached without removing the carriage-wheel. For this reason the ring 1 is preferably formed in two parts 23, hinged together, as at 24, clamped about the inner portion 25 of the hub, and having its free ends 26 secured by a pin or screw 27.

Having thus described my invention, what I claim as new, and desire to secure by Letters Patent, is—

1. In a baby-carriage brake, the open-ended casing 5, having integral arms overlapped at their ends to form axle-receiving sleeves 4', and the sliding locking-bolt mounted in said casing, substantially as set forth.

2. A ratchet-collar for the hubs of baby-carriages formed in two hinged parts with a fastening for holding the collar clamped to the hub, substantially as shown and described.

3. A brake for baby-carriages, consisting of collar 1 on the inner face of the hub of one of the rear wheels, and having ratchet-teeth 3, a bolt 7, with spring 11, for holding it in engagement with ratchet-teeth 3, mounted on the axle 4, adjacent to teeth 3, a casing 5, secured to the axle by sleeves having overlapping slotted ends held by a set-screw, the casing covering the bolt and spring, and a guide-rod 8, mounted in a guide-block 9 on the axle, a pulley 14 on the inner end of casing 5, a tubular casing 15, with a slot 22 at its upper end, mounted on one of the handle-arms 16, an L-shaped handle 20 in the upper end of casing 15, with an arm 21 fitting slot 22, and a chain 12, connected at one end to handle 20, extending through casing 15, passing under pulley 14, and connected to the end of guide-rod 8, substantially as shown and described.

ISAAC LEVY.

Witnesses:
THEODORE R. HELME,
GEORGE E. HOUGHTON.